Jan. 20, 1959  O. C. KREIS  2,869,388

GEAR WHEELS

Filed July 26, 1954

Inventor
Oscar C. Kreis
By J. E. Jones
Attorney

United States Patent Office 2,869,388
Patented Jan. 20, 1959

2,869,388

GEAR WHEELS

Oscar Charles Kreis, Wiesbaden, Germany, assignor to General Motors Corporation, Detroit, Mich., a corporation of Delaware Application July 26, 1954, Serial No. 445,807

Claims priority, application Germany July 24, 1953

1 Claim. (Cl. 74—443)

The invention is concerned with the construction of toothed gear wheels.

Gear wheels which must transmit fairly considerable forces and yet be silent running, such as gear wheels for driving camshafts of internal combustion engines, have hitherto been proposed. Such gear wheels have been proposed made of plastic reinforced with fabric to attain quieter running. Formerly, these gear wheels satisfied the requirements both as regards quietness as well as mechanical strength and wearing qualities. Because of increasing rotational speeds and the increased heat and mechanical stress of present-day internal combustion engines, steel wheels or cast-iron wheels having the requisite mechanical properties have been proposed in which quietness is attained by interposing noise-damping materials such as rubber, for example.

The rubber must be made fairly hard so as to be able to transmit the loads but the hard quality of rubber which this necessitates again produces insufficient damping of the noises.

According to the invention, these difficulties are overcome by making the adhesion faces between the damping rubber and the wheel body as large as possible, so that it is possible to select a quality of rubber which ensures complete damping of noise.

The scope of the invention is defined by the appended claims; and how it can be carried into effect is hereinafter particularly described with reference to the accompanying drawings, in which:

Figures 1, 2:
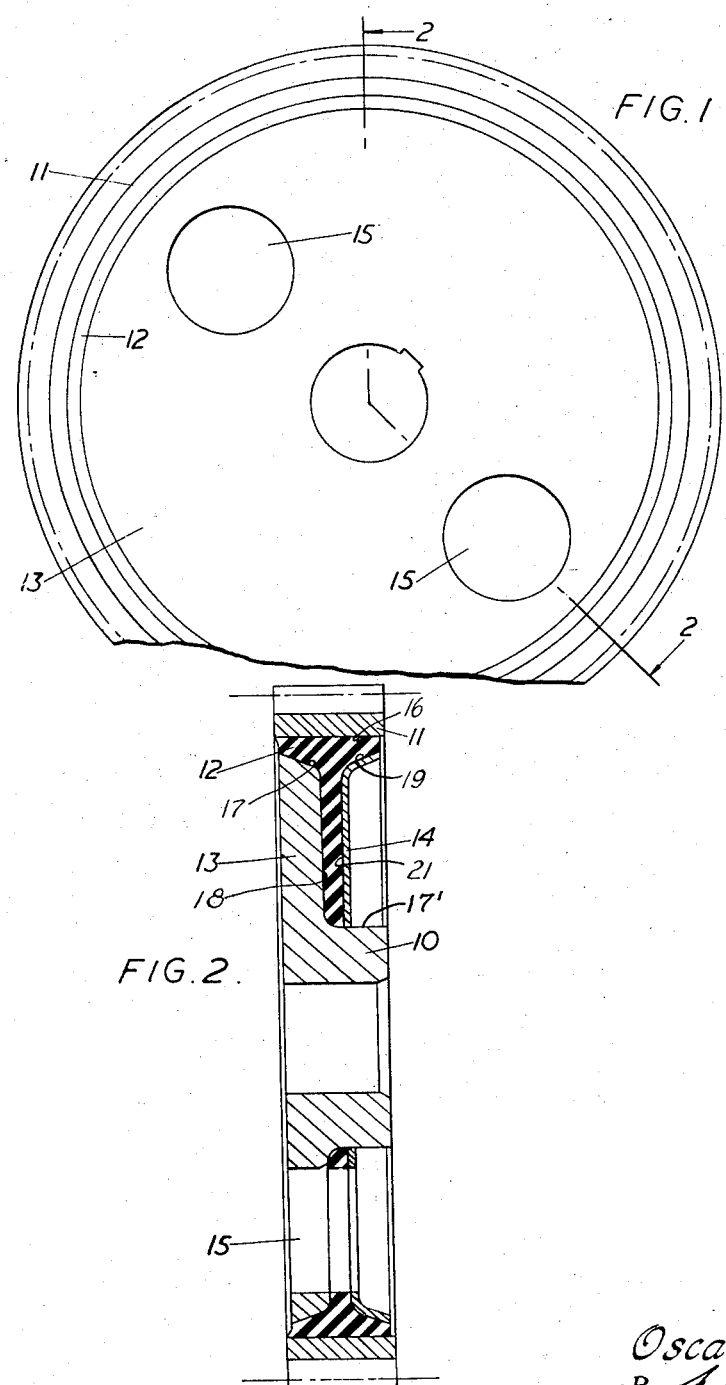
Fig. 1 is an elevation of a camshaft gear wheel embodying the invention.
Fig. 2 is a section on line 2—2 of Fig. 1.

In Figs. 1 and 2 is shown a camshaft gear wheel having a hub 10 and a toothed crown or rim 11 united by an insert 12 of rubber. The insert 12 is of T cross-section and between the wheel disc 13 and a sheet metal plate 14. In the disc 13 are two recesses 15 which also extend through the insert 12. The insert 12 is united with the adjacent parts over the majority of its surface area by vulcanising.

The rim 11 has an inner peripheral surface 16 within which the outer peripheral surface of the T cross-section of the insert 12 is secured. The hub 10 has first and second radially spaced outer peripheral surfaces 17 and 171 respectively between which is a radially extending end surface 18 and to which the surfaces on one side of the T cross-section of insert 12 are secured. The plate 14 has an outer peripheral surface 19 and a radially inwardly extending end surface 21 similar but oppositely related with respect to the first surface 17 and end surface 18, respectively, and adapted to be secured to the opposite surfaces of the T cross-section of the insert 12. It will be apparent that securing the surfaces of the plate 14 to the surfaces of the insert on one side thereof will cause the insert to be more uniformly stressed throughout the entire extent thereof upon relative movement between the rim 11 and hub 10.

The disc 13, insert 12 plate 14 and crown 11 can be alternatively united by making the parts a press fit one to another, or by adhesive or rivetting or the like.

The hub 10 can, if desired, be formed in two parts so that the plate 14 of stamped sheet metal may be dispensed with.

Due to the special shaping of the insert and above all due to its large area of adhesion particularly in a radial plane, the noise-damping properties of the material used for the insert can be improved if desired, at the expense of mechanical strength of the material.

Any resilient material such as natural rubber, artificial rubber, or fibrous material can be used.

I claim:

A gear wheel having a rim and a hub, said rim being of annular formation and having an inner peripheral surface extending between the opposite ends thereof, said hub having first and second radially spaced outer peripheral surfaces and a radial end surface extending between said peripheral surfaces of said hub, a resilient member secured between said inner peripheral surface of said rim and outer peripheral surfaces of said hub and to said radial end surface of said hub, said resilient member being formed to extend axially substantially from end to end of said rim and radially inwardly from said rim to said outer peripheral surfaces of said hub and across said radial end surface of said hub, and a plate having outer peripheral and end surfaces corresponding to the first one of said outer peripheral and said end surfaces of said hub and disposed oppositely with respect to and spaced axially from said first of said peripheral and end surfaces of said hub and secured to said resilient member in spaced relation to said rim and extending to the second of said outer peripheral surfaces of said hub for more uniformly distributing the load applied to said resilient member when said resilient member is stressed by relative movement of said hub and said rim.

References Cited in the file of this patent

UNITED STATES PATENTS

| | | |
|---|---|---|
| 643,134 | Hogeland | Feb. 13, 1900 |
| 1,950,886 | Gunn | Mar. 13, 1934 |
| 2,041,507 | Zeder | May 19, 1936 |
| 2,060,565 | Geyer | Nov. 10, 1936 |
| 2,477,081 | Pierce | July 26, 1949 |
| 2,526,744 | Hardy | Oct. 24, 1950 |

FOREIGN PATENTS

| | | |
|---|---|---|
| 243,518 | Great Britain | Dec. 3, 1925 |
| 675,967 | Great Britain | July 16, 1952 |